United States Patent
Kim et al.

(10) Patent No.: US 7,616,534 B2
(45) Date of Patent: Nov. 10, 2009

(54) METHOD FOR DETERMINING KIND OF OPTICAL RECORDING MEDIUM

(75) Inventors: Ki Man Kim, Gwacheon-si (KR); Soung Hyun Um, Anyang-si (KR)

(73) Assignee: LG Electronics Inc., Seoul (KR)

( * ) Notice: Subject to any disclaimer, the term of this patent is extended or adjusted under 35 U.S.C. 154(b) by 654 days.

(21) Appl. No.: 11/378,488

(22) Filed: Mar. 20, 2006

(65) Prior Publication Data
US 2006/0239160 A1    Oct. 26, 2006

(30) Foreign Application Priority Data
Apr. 25, 2005    (KR)    ....................... 10-2005-0034048

(51) Int. Cl.
*G11B 7/00*    (2006.01)

(52) U.S. Cl. ................ 369/44.28; 369/44.25; 369/53.2; 369/53.23

(58) Field of Classification Search ....................... None
See application file for complete search history.

(56) References Cited

U.S. PATENT DOCUMENTS

2005/0030867 A1*    2/2005    Choi et al. ............... 369/53.23

\* cited by examiner

*Primary Examiner*—Muhammad N. Edun
(74) *Attorney, Agent, or Firm*—Birch, Stewart, Kolasch & Birch, LLP

(57) ABSTRACT

A method for determining a kind of optical recording medium includes: performing focus searching and track searching on an optical recording medium; and determining a kind of optical recording medium according to an optical signal generated by the focus searching and an optical signal generated by the track searching.

12 Claims, 8 Drawing Sheets

METHOD FOR DETERMINING KIND OF OPTICAL RECORDING MEDIUM

BACKGROUND OF THE INVENTION

1. Field of the Invention

The present invention relates to a method for determining a kind of optical recording medium.

2. Description of the Related Art

FIG. 1 is a view of a configuration of a servo system of a related art optical disc device.

The optical disc device includes an LD driver 10, an I/V amplifier, an RF amplifier 30, a spindle motor 40, a spindle driver 50, a sled motor 60, a focus-tracking slid drive 70, and a digital servo processor 80.

Referring to FIG. 1, an object lens of an optical pick-up performs a focus servo operation for reading data in a vertical direction and a tracking servo operation for reading data in a horizontal direction, and reads the data by following a track of an optical disc by the focus-tracking slid driver 70.

In this case, before the data of the optical disc is read by following the track thereof, a kind of inserted optical disc should be recognized first. This is because the data of the optical disc can be accurately read only upon recognizing the kind of the inserted optical disc because of varying distances between an optical disc surface and a data-recording surface and between data and data according to kinds of optical discs. The distance between data is referred to as a track pitch.

FIGS. 2 and 3 are views for describing the related art method for determining a kind of optical disc. In the related art method, a distance between a surface and a data recording surface of an optical disc 10 is used to determine the kind of optical disc 10.

Referring to FIGS. 2 and 3, a laser is turned on and a lens 20 is vertically lifted up. Then, focus searching is performed with the lens 20 moved down to thereby obtain a time difference between a focus boundary waveform, which is a signal reflected from the surface of the optical disc 10, and a focus boundary waveform, which is a signal reflected from the data recording surface thereof. Accordingly, it can be determined whether the inserted optical disc is a DVD or a CD.

A distance (t2) between an optical disc surface and a data recording surface of a CD is twice greater than that (t1) between an optical disc surface and a data recording surface of a DVD. For this reason, the time interval between the focus boundary waveform from an optical disc surface and the focus boundary waveform from an optical disc data recording surface is twice longer than that of the DVD.

When a reference time interval of an optical disc is set in such a manner, the time interval of an inserted optical disc may be compared to the reference time interval to thereby obtain a distance corresponding to the time interval between waveforms of the inserted optical disc. Accordingly, the kind of inserted optical disc may be determined.

However, the related art method for determining the kind of optical disc is problematic for the following reason. The determination is only possible for optical discs with different distances between optical disc surfaces and data recording surfaces thereof. If different kinds of optical discs have the same distances between the optical disc surfaces and the data-recording surfaces, distinguishment between the two cannot be made. For example, both current HD-DVD and DVD have the same distance of 0.6 mm between the optical disc surfaces and the data recording surfaces, and the related art method cannot distinguish between the HD-DVD and DVD.

SUMMARY OF THE INVENTION

Accordingly, the present invention is directed to a method for determining a kind of optical recording medium that substantially obviates one or more problems due to limitations and disadvantages of the related art.

An object of the present invention is to provide a method for determining a kind of optical recording medium capable of determining a kind of optical recording medium.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for determining a kind of optical recording medium, the method including: performing focus searching and track searching on an optical recording medium; and determining a kind of optical recording medium according to an optical signal generated by the focus searching and an optical signal generated by the track searching.

In another aspect of the present invention, there is provided a method for determining a kind of optical recording medium, the method including: moving an optical pick-up in a vertical direction with respect to an optical recording medium to perform focus searching; fixing the optical pick-up to a first point in a vertical direction and moving the optical pick-up in a horizontal direction to perform track searching; and determining a kind of optical recording medium according to optical signals generated by the focus searching and track searching.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

First Embodiment

Referring to FIGS. 4 to 11, a first embodiment of a method for determining a kind of optical recording medium according to the present invention will now be described.

Figure 1:
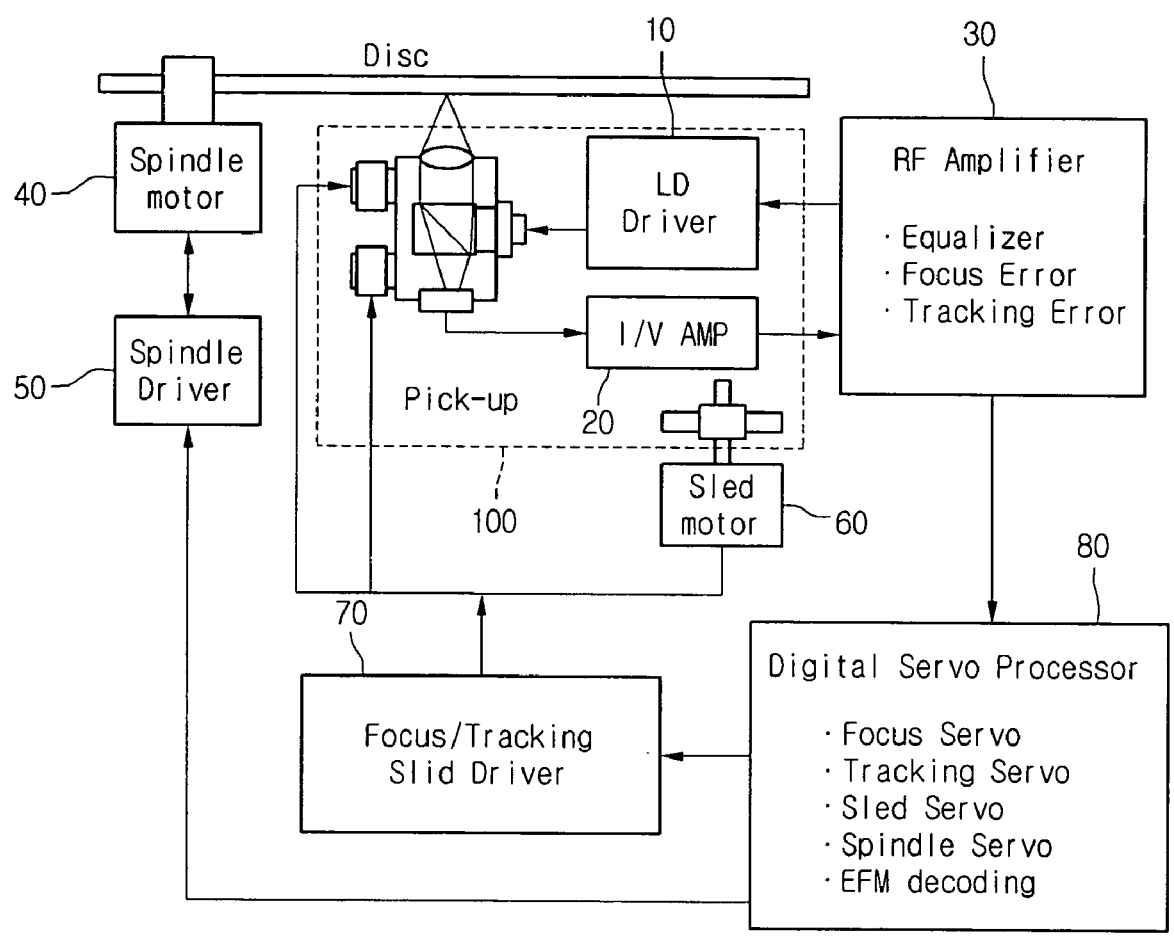
FIG. 1 is a view of a configuration of a servo system of a related art optical disc device.
Figure 2:
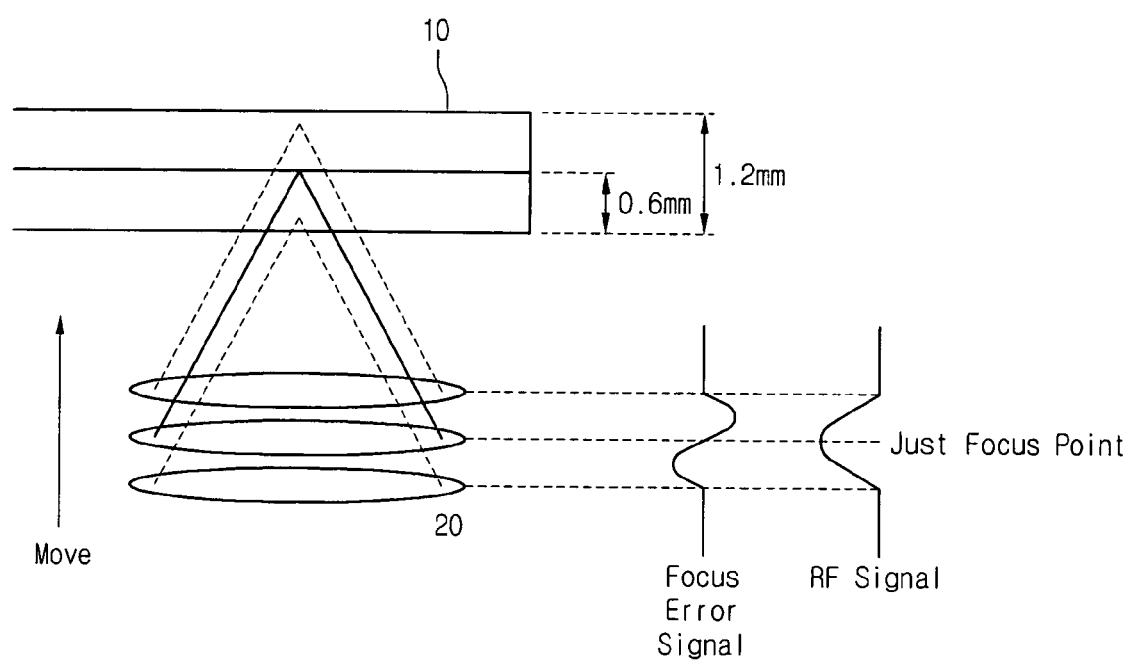
FIGS. 2 and 3 are views for describing a related art method for determining a kind of optical disc.
Figure 3:
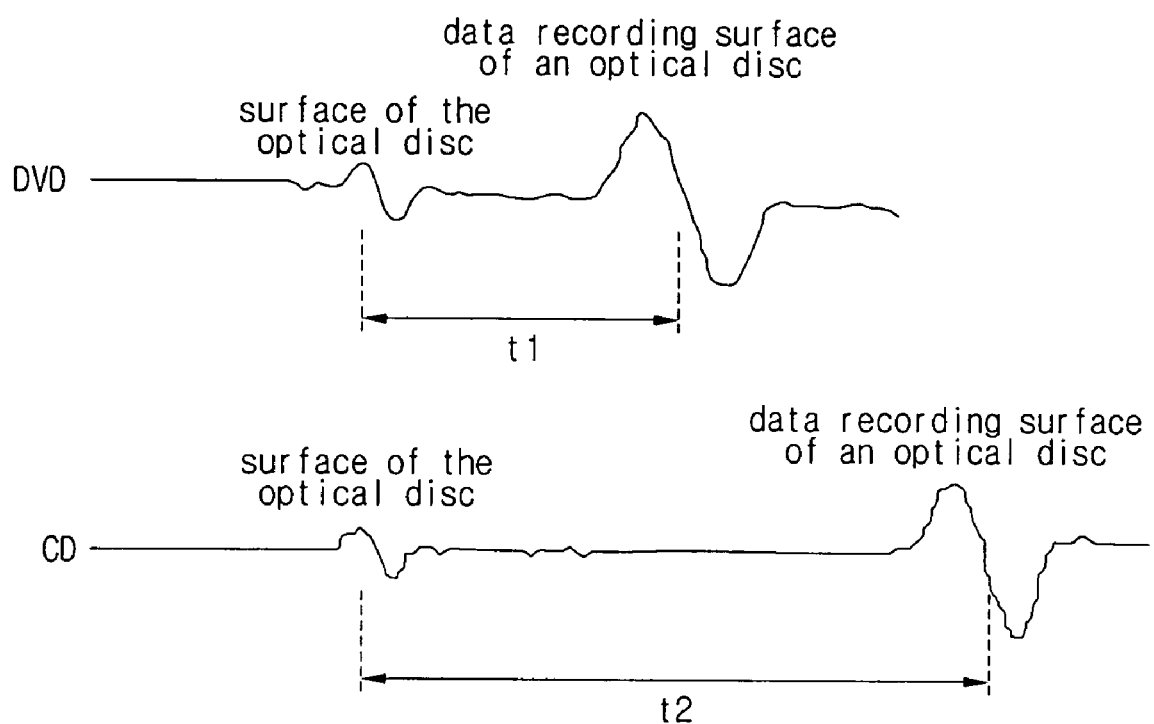
Figure 4:
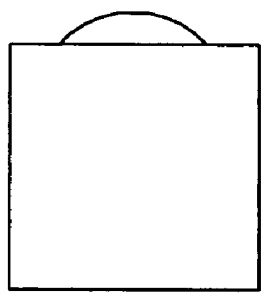
FIG. 4 is a side view of an optical pick-up.
Figure 5:
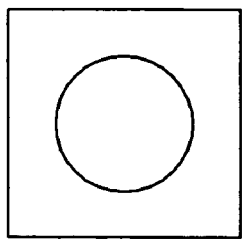
FIG. 5 is a view of an upper side of the optical pick-up.
Figure 6:
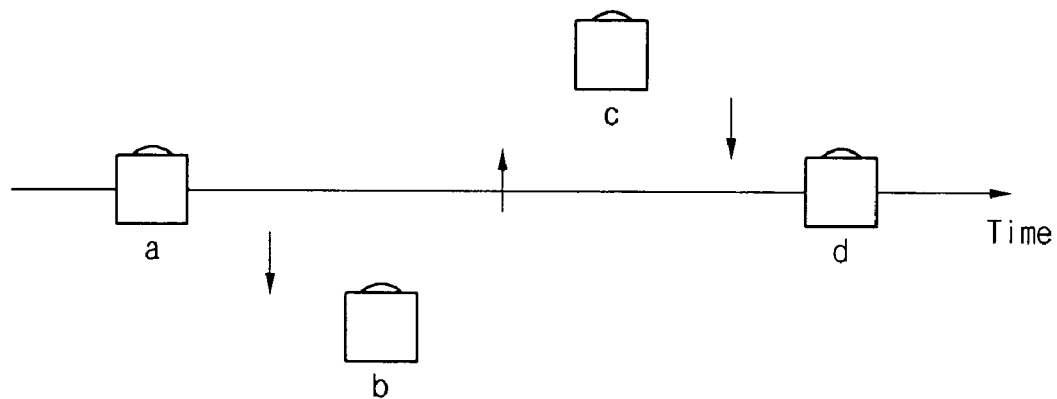
FIG. 6 is a view for describing vertical focus searching of the optical pick-up.
Figure 7:
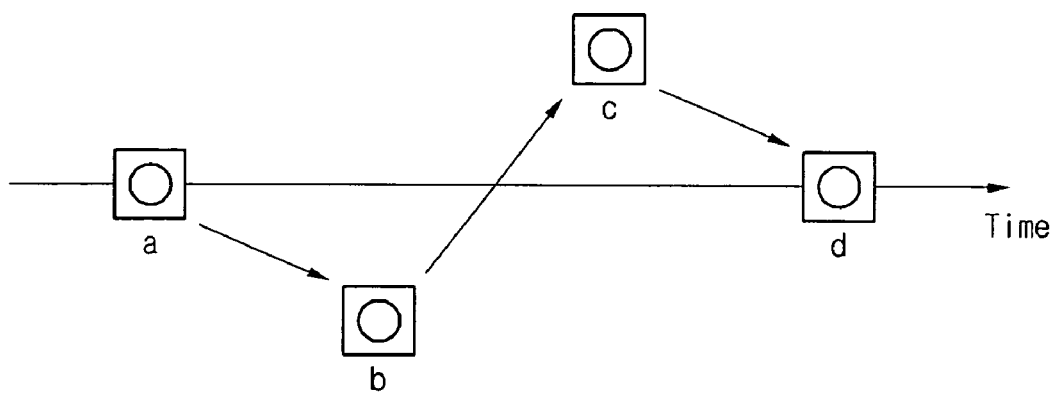
FIG. 7 is a view for describing focus-track searching of the optical pick-up.

FIGS. 4 and 5 are views of an optical pick-up viewed from illustration directions of an optical pick-up of FIGS. 6 and 7, respectively.

FIG. 4 shows an optical pick-up viewed from a side, and FIG. 5 shows the optical pick-up viewed from an upper side.

FIG. 6 shows vertical focus searching in determining a kind of optical disc, and FIG. 7 illustrates focus-track searching in determining a kind of optical disc.

In the related art, the kind of optical disc is determined only by vertical focus-searching while in the present invention, track searching is performed as well as the focus searching. Accordingly, the kind of optical disc is determined in consideration of not only a distance between an optical disc surface and a data recording surface but also an interval between data and data.

Figure 8:
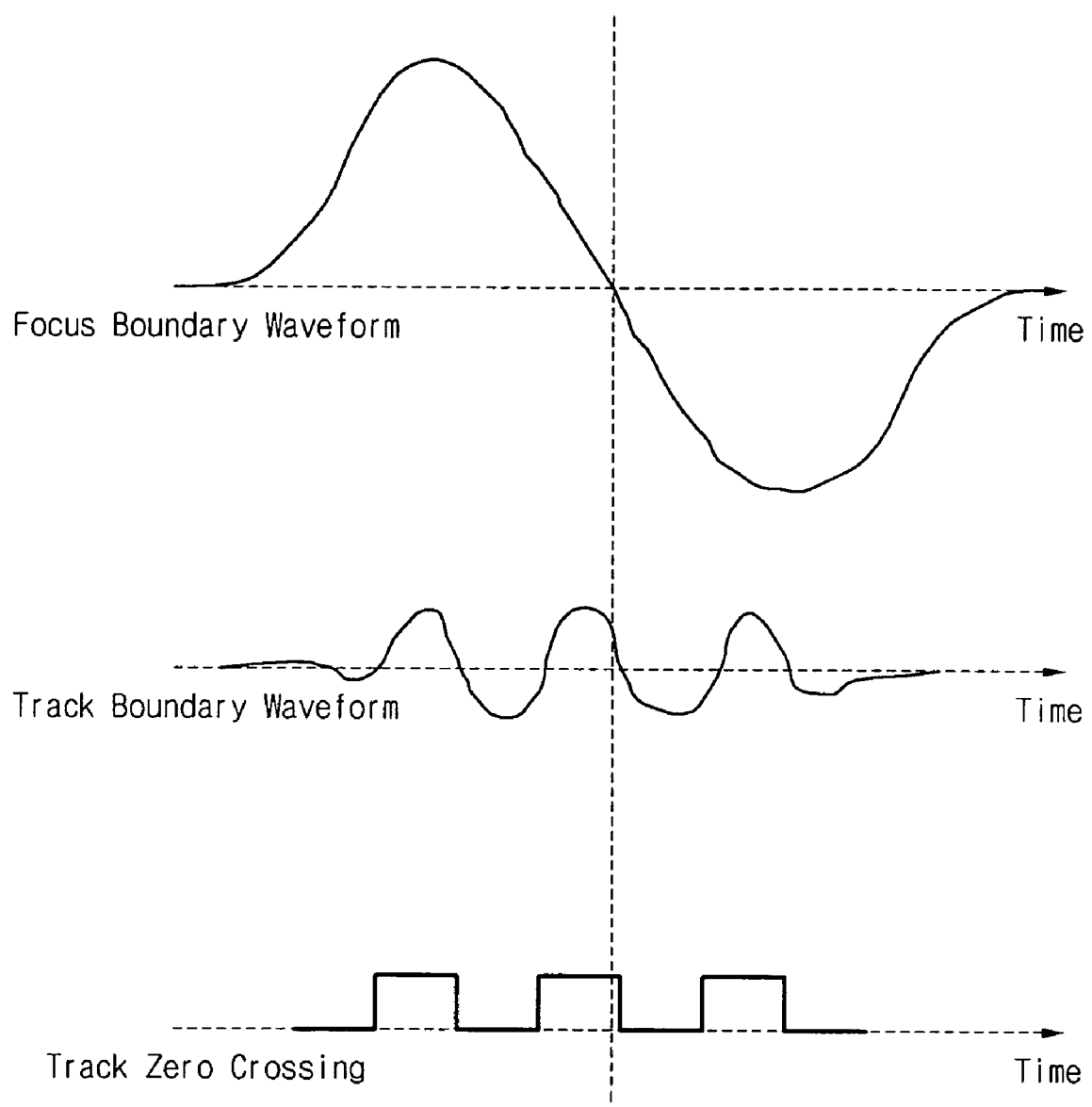
FIG. 8 is a view of boundary waveforms and track zero crossings by focus-track searching when a DVD is inserted.

FIG. 8 illustrates boundary waveforms and track zero crossings by the focus-track searching when a DVD is inserted.

A focus boundary waveform by the focus searching shows waveform deviations occurring at a boundary between an optical disc surface and a data recording surface, thereby obtaining a distance between the optical disc surface and the data recording surface. In the case of a DVD optical disc, because a distance between an optical disc surface and a data recording surface is the same as that of an HD DVD, focus boundary waveforms of the two are identical.

FIG. 8 illustrates a track boundary waveform generated through track searching and track zero crossings thereof when a DVD optical disc is inserted. According to a track pitch, which is an inter-data distance, a track boundary waveform is generated for each data track. For the purpose of explicit visualization, the track boundary waveform is depicted as track zero crossings.

Figure 9:
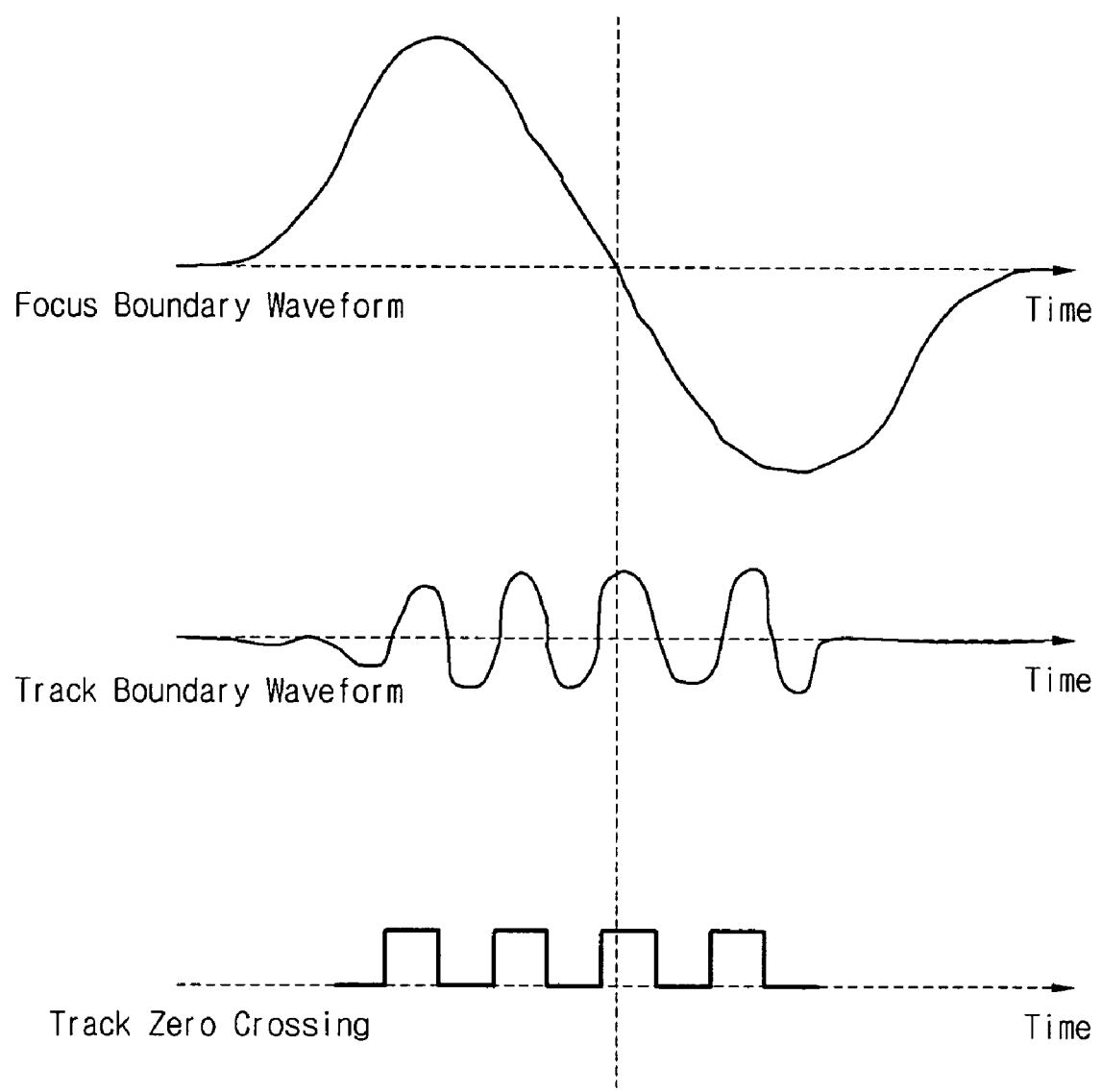
FIG. 9 is a view of boundary waveforms and track zero crossings when an HD DVD is inserted.

FIG. 9 illustrates a track boundary waveform generated through focus-track searching and track zero crossing points thereof when an HD DVD optical disc is inserted.

A track boundary waveform is generated from every data track according to a track pitch that is an inter-data distance. For the explicit visualization, the track boundary waveform is depicted as track zero crossings.

Referring to FIGS. 8 and 9, the DVD and the HD DVD have the same distance between the optical disc surfaces and data recording surfaces, thereby having identical generation points of the focus boundary waveforms. However, in the DVD and the HD DVD, their track pitches, inter-data distances, are different from each other, thereby having different track zero crossing points by the track searching.

Accordingly, when a track zero crossing period of each optical disc is measured at a constant track searching rate, the track zero crossing period up to a point of focus boundary waveform generation becomes proportional to a track pitch. Accordingly, a certain point is set as a point of focus boundary waveform generation, and track zero crossings are detected up to the point, thereby determining the kind of inserted optical disc.

Here, a reference focus boundary waveform is not particularly set but is simply a reference point for detecting the track zero crossings of each optical disc.

For example, the track pitch of a DVD is 0.74 μm over an entire area, and the track pitch of an HD DVD is 0.68 μm in a system lead-in area and 0.34 μm at the other area.

On the assumption that a track zero crossing period of the system lead-in area of the HD DVD is set to 1 in performing the track searching at a constant speed, proportional expression 0.74:0.34=X:1 can be obtained because the track pitch and the track zero crossing period are proportional to each other. It can be seen by the proportional expression that a track zero crossing period of a DVD is 2.18, which is longer than that of the HD DVD by 1.18. In such a manner, the kind of inserted optical disc can be determined.

Likewise, the track pitch is in inverse proportion to a frequency of the track zero crossing. Therefore, when the frequency of an HD DVD is set to 1 under the same condition with that of the aforementioned example, the proportional expression 0.74:0.73=1:X can be obtained. The frequency of a DVD according to the expression is 0.46. Thus, the measured frequency is compared to a pre-calculated frequency so that the kind of inserted disc can be determined.

Figure 10:
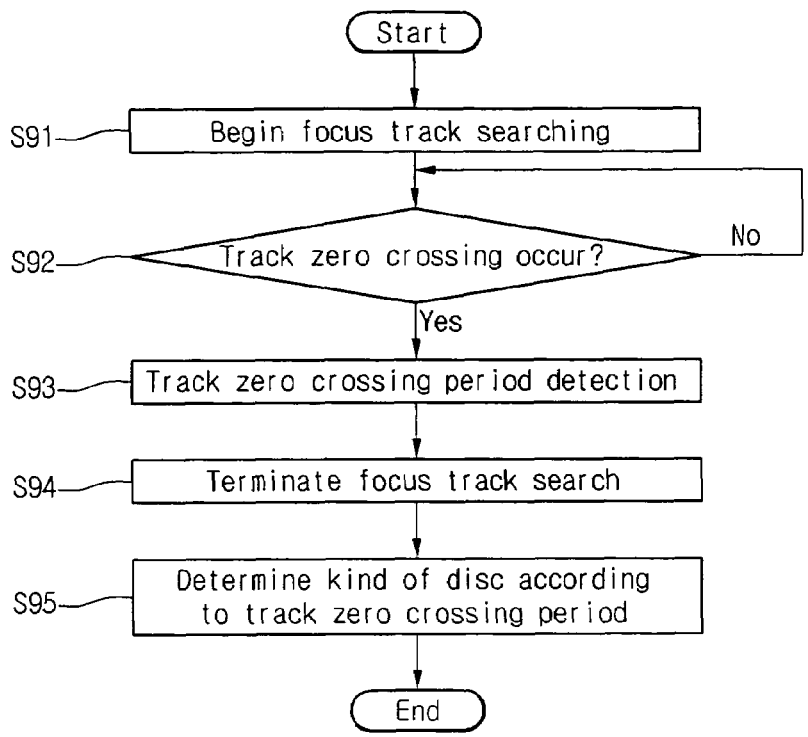
FIG. 10 is a flowchart of a method for determining a kind of optical recording medium according to an embodiment of the present invention.

FIG. 10 is a flowchart for describing a method for determining a kind of optical recording medium according to the first embodiment of the present invention.

Referring to FIG. 10, when an optical is inserted, track searching begins together with focus searching (S91).

Then, when a track zero crossing occurs while the focus-track searching is repetitively performed (S92), a period or a frequency of the track zero crossing is measured (S93). Then, the focus-track searching is terminated (S94), and a kind of inserted optical is determined according to the period or frequency of the track zero crossing (S95).

Figure 11:
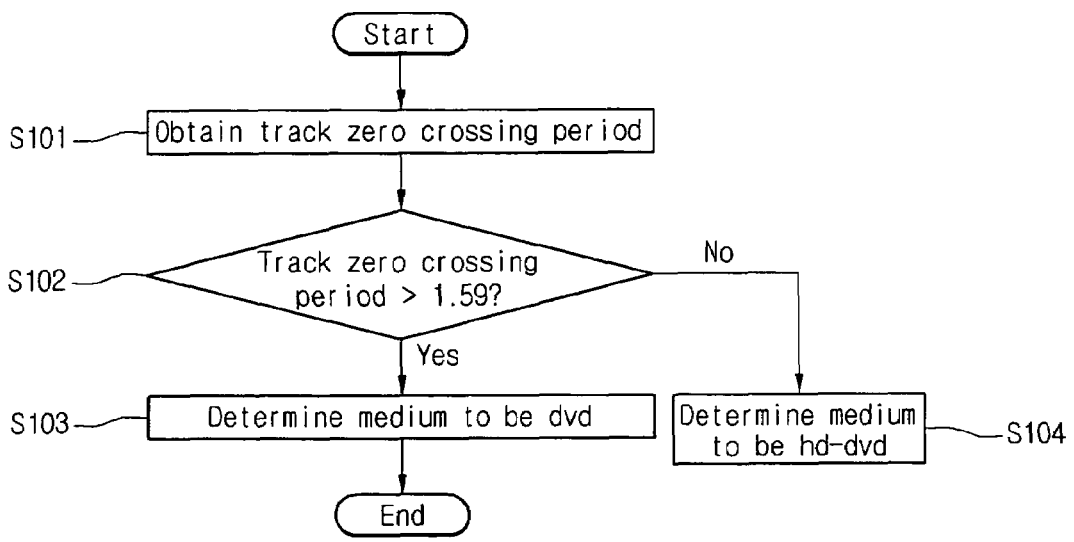
FIG. 11 is a flowchart of optical-disc determination on the assumption that a track zero crossing period of an HD DVD is 1.

FIG. 11 is a flowchart of optical disc determination on the assumption that a track zero crossing period of an HD DVD is set to 1. Referring to FIG. 11, a track zero crossing period is measured (S101), and it is checked whether or not the obtained track zero crossing period is longer than 1.59, which is an arbitrary value (S102). If the period is longer than 1.59, the inserted optical disc is determined to be a DVD optical disc whose track zero crossing period is 2.18 (S103). If not, the inserted optical disc is determined to be an HD DVD (S104).

Second Embodiment

A method for determining a kind of optical recording medium according to a second embodiment of the present invention will now be described.

Figure 12:
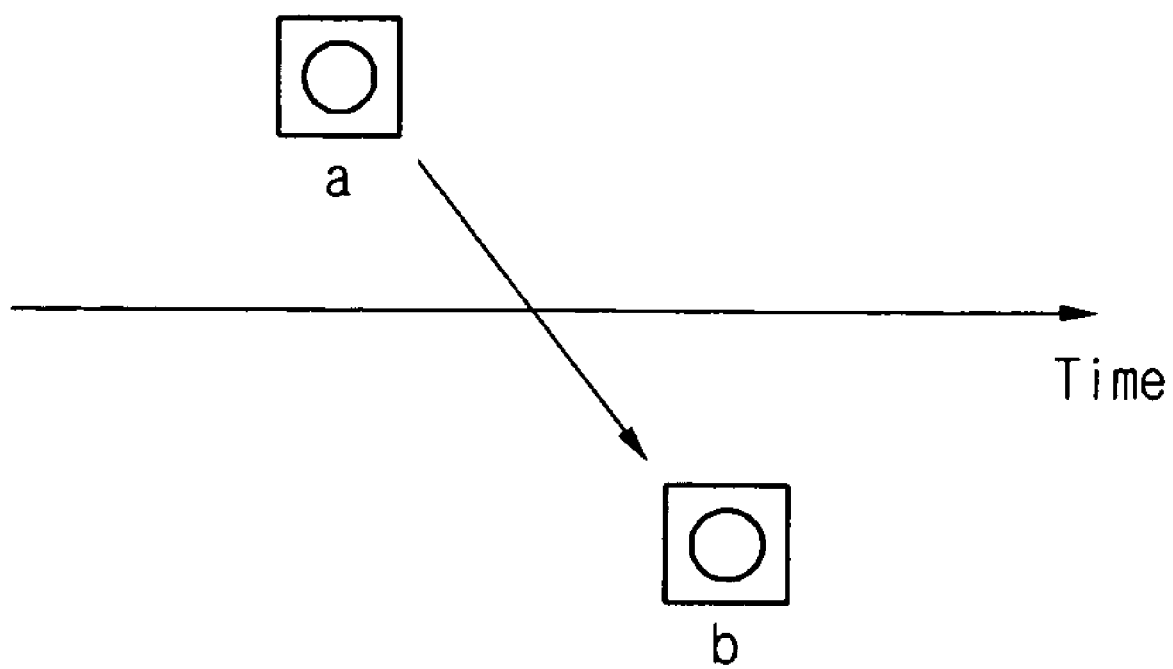
FIG. 12 is a view for describing horizontal track searching in the method for determining a kind of optical recording medium according to the present invention.

FIG. 12 illustrates horizontal track searching in determining a kind of optical disc.

Unlike the first embodiment in which track searching is performed simultaneously with focus searching, in the second embodiment, the focus searching and track searching are not simultaneously performed but only the track searching is performed while a focus point is fixed to a certain point.

For example, the focus point is placed at the focus zero crossing and only the track searching is performed.

When a track zero crossing period of each optical disc is detected, the period is in proportion to a track pitch at the focus zero crossing point. Therefore, the track zero crossing is detected with a point of focus boundary waveform generation set as a reference, thereby determining a kind of an inserted optical disc.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for determining a kind of optical recording medium, the method comprising:
    moving an optical pick-up in a vertical direction with respect to an optical recording medium to perform focus searching;
    fixing the optical pick-up to a first point in the vertical direction and moving the optical pick-up in a horizontal direction to perform track searching; and
    determining a kind of optical recording medium according to optical signals generated by the focus searching and track searching.

2. The method according to claim 1, wherein a distance between a surface and a data recording surface of the optical recording medium is calculated by an optical signal generated by the focus searching.

3. The method according to claim 1, wherein a distance between data and data is calculated by an optical signal generated by the track searching.

4. The method according to claim 1, wherein the first point is a focus zero crossing point.

5. The method according to claim 1, wherein a track zero crossing period is extracted by the track searching.

6. The method according to claim 5, wherein when the track zero crossing period is longer than a preset reference, the optical recording medium is determined to be a DVD, and when the track zero crossing period is shorter than the preset reference, the optical recording medium is determined to be an HD DVD.

7. The method according to 1, further comprising:
    comparing an optical signal generated by the focus searching and an optical signal generated by the track searching with a preset reference.

8. An apparatus for determining a kind of optical recording medium, comprising:
    a servo configured
        to move an optical pick-up in a vertical direction with respect to an optical recording medium to perform focus searching,
        to fix the optical pick-up to a first point in the vertical direction, and
        to move the optical pick-up in a horizontal direction to perform track searching; and
    a controller configured to determine a kind of optical recording medium according to optical signals generated by the focus searching and track searching.

9. The apparatus according to claim 8, wherein the controller is configured to calculate a distance between a surface and a data recording surface of the optical recording medium by an optical signal generated by the focus searching.

10. The apparatus according to claim 8, wherein the controller is configured to calculate a distance between data and data by an optical signal generated by the track searching.

11. The apparatus according to claim 8, wherein the controller is configured to determine the optical recording medium as a DVD when a track zero crossing period extracted by the track searching is longer than a preset reference, and
    to determine the optical recording medium is a high density DVD when the track zero crossing period is shorter than the preset reference.

12. The apparatus according to claim 8, wherein the controller is configured to compare an optical signal generated by the focus searching and an optical signal generated by the track searching with a preset reference.

* * * * *